US007398554B1

(12) United States Patent
Falik et al.

(10) Patent No.: US 7,398,554 B1
(45) Date of Patent: Jul. 8, 2008

(54) SECURE LOCK MECHANISM BASED ON A LOCK WORD

(75) Inventors: Ohad Falik, Kfar Saba (IL); Valery Teper, Herzlia (IL); Ilan Margalit, Tel-Aviv (IL)

(73) Assignee: Winbond Electronics Corporation, Hsinchu (TW)

( * ) Notice: Subject to any disclaimer, the term of this patent is extended or adjusted under 35 U.S.C. 154(b) by 1075 days.

(21) Appl. No.: 10/115,460

(22) Filed: Apr. 2, 2002

(51) Int. Cl.
    H04L 29/00 (2006.01)
(52) U.S. Cl. .......................... 726/23; 726/22; 726/24; 726/25; 365/185.04; 365/185.29; 365/185.33; 365/189.01
(58) Field of Classification Search ................ 713/194; 726/22–25; 714/747, 819; 365/185.04, 185.29, 365/189.01, 185.33
    See application file for complete search history.

(56) References Cited

U.S. PATENT DOCUMENTS

| 4,589,092 | A | * | 5/1986 | Matick | 711/207 |
|---|---|---|---|---|---|
| 4,604,694 | A | * | 8/1986 | Hough | 710/200 |
| 5,371,709 | A | * | 12/1994 | Fisher et al. | 365/226 |
| 5,394,367 | A | * | 2/1995 | Downs et al. | 365/195 |
| 5,442,704 | A | * | 8/1995 | Holtey | 711/163 |
| 5,592,641 | A | * | 1/1997 | Fandrich et al. | 711/103 |
| 5,673,222 | A | * | 9/1997 | Fukumoto et al. | 365/185.04 |
| 5,749,088 | A | * | 5/1998 | Brown et al. | 711/115 |
| 5,802,583 | A | * | 9/1998 | Yeager et al. | 711/152 |
| 5,845,332 | A | * | 12/1998 | Inoue et al. | 711/163 |
| 5,896,338 | A | * | 4/1999 | Landgraf et al. | 365/226 |
| 5,930,826 | A | * | 7/1999 | Lee et al. | 711/163 |
| 6,026,016 | A | * | 2/2000 | Gafken | 365/185.04 |
| 6,035,401 | A | * | 3/2000 | Dalvi et al. | 714/746 |
| 6,154,819 | A | * | 11/2000 | Larsen et al. | 711/163 |
| 6,363,463 | B1 | * | 3/2002 | Mattison | 711/164 |
| 6,415,386 | B1 | * | 7/2002 | Shi et al. | 726/34 |
| 6,976,136 | B2 | * | 12/2005 | Falik et al. | 711/152 |
| 2002/0095545 | A1 | * | 7/2002 | Dalvi et al. | 711/103 |
| 2002/0166058 | A1 | * | 11/2002 | Fueki | 713/194 |
| 2003/0097507 | A1 | * | 5/2003 | Lin | 710/302 |
| 2003/0101381 | A1 | * | 5/2003 | Mateev et al. | 714/38 |
| 2003/0190922 | A1 | * | 10/2003 | Dalvi et al. | 455/502 |

OTHER PUBLICATIONS

Torre et al. "Non-intrusive debugging using the JTAG interface of FPGA-based prototypes", IEEE, 2002.*
Emosyn White Paper, "Security Concerns for Memory Technologies in Smart Cards, Flash Versus Marked ROM", Version 1.1, Feb. 2004.*

* cited by examiner

*Primary Examiner*—Kambiz Zand
*Assistant Examiner*—Tongoc Tran (57) ABSTRACT

One or more lock words in a non-volatile memory with write ability correspond to lockable features of a protected system including the memory. A lockable feature should be locked when the corresponding lock word has a value equal to one of a limited number of predetermined locking combination(s). The locking combination(s) are selected so as to minimize the probability of the lock word waking up from manufacture with a value equal to one of the locking combination(s). In order to detect whether allowable usage of a lockable feature should be at a predetermined locked or unlocked level, multi-sampling of the corresponding lock word value is performed. If there is variation among the sampled values of the lock word, a malicious attack is identified. In one preferred embodiment, the multi-sampling occurs upon power up reset of the protected system and if a malicious attack is identified, the protected system is kept in reset.

40 Claims, 6 Drawing Sheets

| | | | | |
|---|---|---|---|---|
| DEFAULT CONDITIONS | LOCK WORD 1 VALUE = LOCKING COMBINATION | LOCK WORD 2 VALUE ≠ LOCKING COMBINATION | LOCK WORD 3 VALUE ≠ LOCKING COMBINATION | LOCK WORD 3 VALUE ≠ LOCKING COMBINATION |
| | PROTECTED SYSTEM REMAINS IN RESET 602 | | | |
| NO HACK ATTACK IDENTIFIED | DISABLE JTAG ACCESS TO FIRST LOCKABLE SECTION OF MEMORY 604 | ENABLE JTAG ACCESS TO FIRST LOCKABLE SECTION OF MEMORY 606 | DISABLE JTAG ACCESS TO SECOND LOCKABLE SECTION OF MEMORY 608 | LOCK WORD 1 VALUE ≠ LOCKING COMBINATION |
| | | | ENABLE JTAG ACCESS TO SECOND LOCKABLE SECTION OF MEMORY 610 | DISABLE JTAG ACCESS TO THIRD LOCKABLE SECTION OF MEMORY 612 |
| | | | | ENABLE JTAG THIRD LOCKABLE SECTION OF MEMORY 614 |
| HACK ATTACK IDENTIFIED | PROTECTED SYSTEM REMAINS IN RESET 616 | | | |

FIG. 6

SECURE LOCK MECHANISM BASED ON A LOCK WORD

TECHNICAL FIELD OF THE INVENTION

The present invention relates to the field of system protection including nonvolatile memory with write ability, and, more specifically, systems and methods to protect locked features of a system including a non-volatile memory from hack attacks.

BACKGROUND OF THE INVENTION

For many non-volatile memory applications, data integrity and confidentiality is critical. Typically, data is stored in non-volatile memory, and then all or part of the memory, or all or part of the system including the memory, is locked.

In the Intel 82802Ax firmware hub, blocks of the non-volatile flash memory can be locked until a next reset, after which blocks can be unlocked if desired. This block locking and unlocking is controlled by read-lock bits, write-lock bits, and lock-down bits. For each block of memory, a read lock bit in the clear (or default) state allows normal operation for reads in the corresponding block and in the set state prevents read operation for the corresponding block. For each block of memory a write lock bit in the set (default) state prevents program or erase operations in the corresponding block and in the clear state allows normal operation for programming and erase in the corresponding block. For each block of memory a lock down bit in the clear (default) state allows normal operation for write-lock and read-lock bit altering in the corresponding block and in the set state prevents further set or clear operations to the write-lock and read-lock bits. Therefore if a lock-down bit is set, the corresponding block will remain locked down until reset or until the device is power-cycled.

National Semiconductor PC87591x includes in a flash memory a flash protection word. The protection word is read by hardware during the internal reset process and stored in a register. If the word equals '111', for example, flash access is enabled for both read and write. If the word equals any other value, flash access is protected. When flash access is protected, neither reads nor writes are allowed using the external interfaces (e.g., JTAG, parallel, etc.). However, special erase operations that erase the entire flash memory (including the flash protection word) other than factory parameters are allowed using the external interfaces.

U.S. Pat. No. 6,035,401 to Dalvi et al. describes a flash memory device including a first memory array, a control circuit coupled to the first memory array, and a second independent memory array coupled to the control circuit. The first memory array includes a plurality of memory blocks each having a memory cell. The second memory array includes a plurality of block lock bits each corresponding to one of the plurality of memory blocks. The state of each block lock bit indicates whether the memory cell in the corresponding memory block is locked. The second memory array may also include a master lock bit that indicates whether the block lock bits are locked. In one embodiment, once the master lock-bit has been set, it may not be erased or cleared.

U.S. Pat. No. 6,073,243 to Dalvi et al. describes a flash memory device including a first memory array, block locking circuitry and control circuitry. The memory array includes a plurality of memory blocks each having a memory cell. The block locking circuitry includes a plurality of block lock bits and a master lock bit. The control circuitry is configured to receive a passcode that causes the control circuitry to override the master lock bit. The control circuitry may also be configured to receive a passcode that causes the control circuitry to override one of the block lock bits.

Glitch attacks are attacks through any interface where a hacker (i.e., malicious attacker) uses abnormal environmental conditions to try to generate malfunctions of a temporary nature that can expose the secrets of a system or remove the protection of a system. The attack may be aimed at causing one or more flip-flops to adopt the wrong state or to corrupt data values as they are transferred between registers and memory. Often, the glitch attacker attempts to create a malfunction using techniques such as clock signal transients, power supply transients, external electric field transients, and heat application to impact the clock, voltage, temperature, etc.

As an example of a feasible glitch attack, assume that upon reset a protection word is read from one memory location and the value of the protection word is written to (stored in) another memory location so as to control subsequent access to a system or parts of the system. In such a case, a hacker could repetitively reset the system, each time trying to create a malfunction so as to disturb the read or write operations, until access is enabled.

Assuming a flash protection word of at least two bits, if only one unlocked value for the flash protection word is allocated, there is some protection against a glitch attack because of the increased difficulty of causing a malfunction that will bring about the exact unlocked value. However such a flash memory is more likely to wake up in the locked state (i.e., to be in the locked state after wafer manufacturing) due to the plurality of possible locked values. The capability to erase the protection word along with any corresponding protected block may consequently be provided in order to allow recovery of memory that wakes up in the locked state. However, this erase capability can then be exploited by a malicious attacker to erase the protection word along with any corresponding protected block and inject a virus while writing new data to the flash memory.

Atmel AT 88SC1616C including EEPROM memory, uses three fuses that must be blown during the device personalization process. Each fuse locks certain portions of the configuration zone as One Time Programmable (OTP) memory. Fuses are designed for the module manufacturer, card manufacturer and card issuer and should be blown in sequence, allowing each to store new information while protecting the information programmed in previous steps. Alternatively, all programming of the device and blowing of the fuses may be performed at one final step.

Fuse technology has however some inherent limitations. For example, fuse technology may require special process techniques difficult to implement and/or may end up adding significant costs to the implementation. In addition, a mechanism is often required to continuously read the fuses and convert the read states of the fuses to operations to protect the device. Assuming the state of the fuses is read continuously, glitch attacks may temporarily disturb the reading but will not enable access. Finally, although access may be prevented, fuse technology by itself may not necessarily identify a glitch attack per se and therefore may not cause all appropriate reactions to the glitch attack to be performed.

What is needed in the art are systems and methods to protect locked features of a system including a non-volatile memory from hack attacks such as glitch attacks, without using fuse technology. What is needed in the art are systems and methods to identify the occurrence of certain types of hack attacks on the system including the non-volatile memory. What also is needed in the art are systems and methods to predispose a system including a non-volatile memory having an unknown initial value after manufacturing to wake up unlocked.

SUMMARY OF THE INVENTION

In light of the above-discussed deficiencies of the prior art, the present invention provides a method for identifying hack attacks against a protected system including a nonvolatile memory with write ability. The method comprises, for each of at least one lock word corresponding to at least one lockable feature of the protected system, the steps of (i) reading a value of each at least one lock word from the non volatile memory at least two times, (ii) for each at least one lock word, comparing all of the at least two read values, and (iii) if the comparing yields a non-match, identifying a hack attack.

According to an advantageous embodiment hereof, the present invention also provides a system for identifying hack attacks against a protected system, comprising (i) a non volatile memory with write ability, (ii) at least one state machine configured to provide for each of at least one lock word for at least two times an address of each lock word and a read indication to read a value of each lock word, (iii) at least one reading comparator configured to compare values read during the at least two times for each lock word, (iv) logic circuitry configured to store comparison results of the at least one reading comparator, and (v) hacking logic configured to identify a hack attack if the comparison results include a non-match.

According to another advantageous embodiment, the present invention further provides a method for liberalizing use of lockable features of a protected system including a non-volatile memory with write ability, comprising the steps of (i) consecutively checking a desired state of at least one lockable feature of the protected system a limited number of times, wherein during the consecutive checking step, allowable use of the at least one feature is restricted in accordance with a predetermined locked level, and (ii) if all the consecutive checking identically reflect a desired unlocked state, liberalizing use of the at least one feature to a predetermined unlocked level.

According to the present invention, there is still further provided, a system for liberalizing use of lockable features of a protected system, comprising (i) a non-volatile memory with write ability, (ii) at least one checker configured to check a limited plurality of times a desired state for each lockable feature, and (iii) at least one unlocker configured to liberalize use of any of the each lockable feature whose plurality of checks identically reflect a desired unlocked state.

According to the present invention, there is provided at least one mask that includes topographic information to implement a method for identifying hack attacks against a protected system including a non-volatile memory with write ability comprising (i) for each at least one lock word corresponding to at least one lockable feature of the protected system, reading a value of each at least one lock word from the non volatile memory at least two times, and (ii) for each at least one lock word, comparing all of the at least two read values, and if the comparing yields a non-match, identifying a hack attack.

According to the present invention there is also provided, at least one mask that includes topographic information to implement a method for liberalizing use of lockable features of a protected system including a non-volatile memory with write ability, comprising (i) consecutively checking a desired state of at least one lockable feature of the protected system a limited number of times, wherein during the consecutive checking, allowable use of the at least one feature is restricted in accordance with a predetermined locked level, and (ii) if all the consecutive checking identically reflect a desired unlocked state, liberalizing use of the at least one feature to a predetermined unlocked level.

According to the present invention there is provided a program storage device readable by machine, tangibly embodying a program of instructions executable by the machine to perform method steps for identifying hack attacks against a protected system including a nonvolatile memory with write ability, comprising (i) for each at least one lock word corresponding to at least one lockable feature of the protected system, reading a value of each at least one lock word from the non volatile memory at least two times, and (ii) for each at least one lock word, comparing all of the at least two read values, and if the comparing yields a non-match, identifying a hack attack.

According to the present invention there is also provided, a computer program product comprising a computer useable medium having computer readable program code embodied therein for identifying hack attacks against a protected system including a nonvolatile memory with write ability, the computer program product comprising (i) computer readable program code for causing the computer for each at least one lock word corresponding to at least one lockable feature of the protected system, to read a value of each at least one lock word from the non volatile memory at least two times, and (ii) computer readable program code for causing the computer for each at least one lock word, to compare all of the at least two read values, and if the comparing yields a non-match, identify a hack attack.

According to the present invention there is further provided, a program storage device readable by machine, tangibly embodying a program of instructions executable by the machine to perform method steps for liberalizing use of lockable features of a protected system including a non-volatile memory with write ability, comprising (i) consecutively checking a desired state of at least one lockable feature of the protected system a limited number of times, wherein during the consecutive checking, allowable use of the at least one feature is restricted in accordance with a predetermined locked level, and (ii) if all the consecutive checking identically reflect a desired unlocked state, liberalizing use of the at least one feature to a predetermined unlocked level.

According to the present invention there is still further provided a computer program product comprising a computer useable medium having computer readable program code embodied therein for liberalizing use of lockable features of a protected system including a non-volatile memory with write ability, the computer program product comprising (i) computer readable program code for causing the computer to consecutively check a desired state of at least one lockable feature of the protected system a limited number of times, wherein during the consecutive checking, allowable use of the at least one feature is restricted in accordance with a predetermined locked level, and (ii) computer readable program code for causing the computer if all the consecutive checking identically reflect a desired unlocked state, to liberalize use of the at least one feature to a predetermined unlocked level.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms "controller," "state machine," "comparator," "logic," "processor," "checker," "locker," and "unlocker" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The invention is herein described, by way of example only, with reference to the accompanying drawings, wherein like numbers designate like objects, and in which.

DESCRIPTION OF THE PREFERRED EMBODIMENTS

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system.

A preferred embodiment of the present invention protects features of a system including a non-volatile memory that should be locked. For example, in some implementations, the feature is a section of memory and once the section is locked, writing to and erasing the section via an external interface should not be allowed. In a preferred embodiment, the system including a non-volatile memory is protected against malicious attacks, for example glitch attacks or virus attacks. In a preferred embodiment, selected locking combinations allow permanent locking of corresponding features (and therefore minimize the possibility of virus introduction and exposure of secrets) while also minimizing the likelihood of the features waking up in the locked state. In a preferred embodiment, repeatedly checking (i.e. multi-sampling) the desired state of the features reduces the likelihood of a glitch attacker gaining use of features in accordance with unlocked conditions, when usage should be in accordance with locked conditions. In a preferred embodiment if the results of a limited number of repeated checks identically reflect a desired unlocked state for a feature, use of the feature in accordance with unlocked conditions is allowed.

A preferred embodiment of the present invention also identifies certain types of hack attacks that aim to cause erroneous detection of the desired state as being unlocked, for example glitch attacks. Upon identification of an attempted attack, appropriate actions can be taken or continued, as will be described below.

The term "state" as used below includes both cases where there are only two possible values and cases where there are multiple possible values indicative of locked/unlocked. For example, if the desired state of a feature is reflected by the value of a one-bit word, then the two possible values of the bit reflect the two possible states, locked and unlocked. However, if the desired state of a feature is reflected by the value of an m-bit word, then the $2^m$ possible values of the word can each be mapped to the unlocked or locked state.

The principles and operation of memory protection according to the present invention may be better understood with reference to the drawings and the accompanying description. All examples given below are non-limiting illustrations of the invention described and defined herein.

Figure 1:
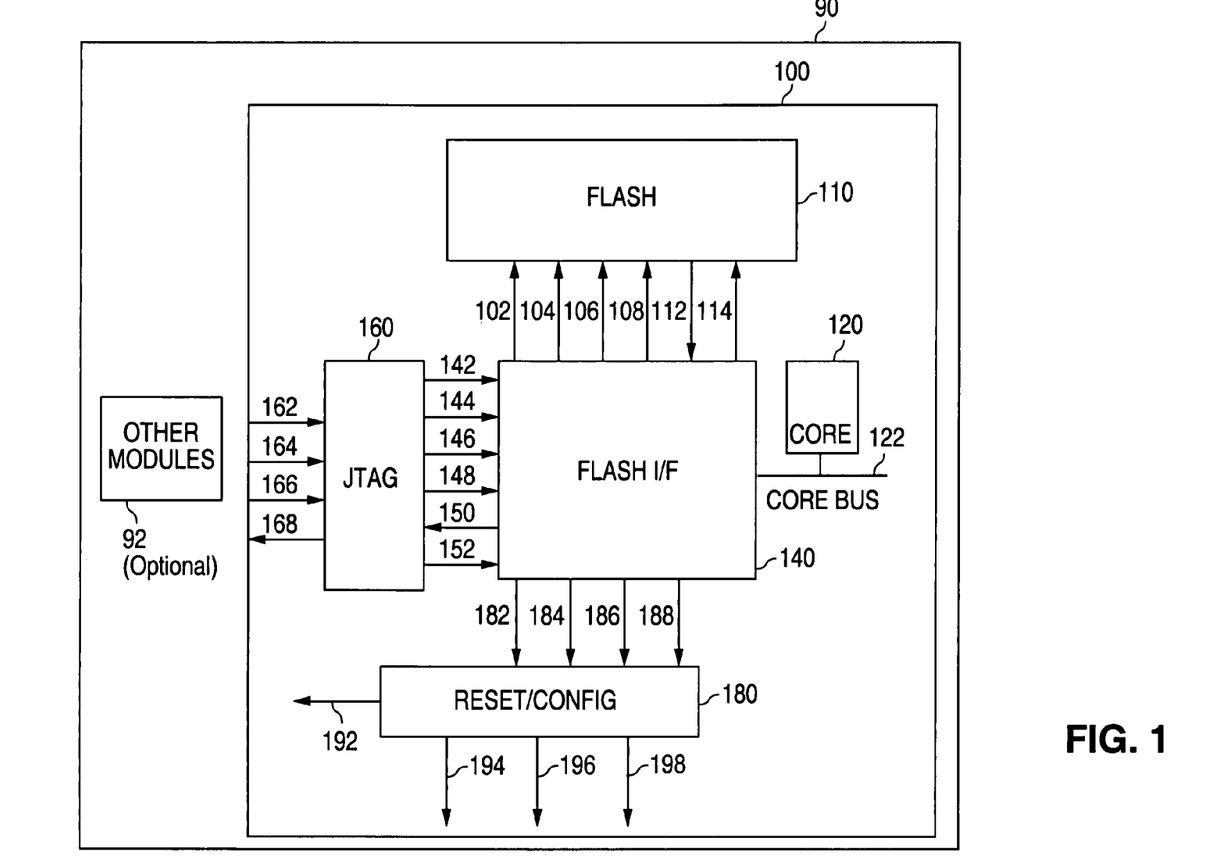
FIG. 1 is a block diagram of a system of the invention, in accordance with a preferred embodiment of the present invention.

Referring now to the drawings, FIG. 1 illustrates a block diagram of a system of the invention, according to a preferred embodiment. A protected system 90 can be a single chip, or a group of chips. A module 100 forms part or all of protected system 90. Module 100 includes elements related to the accessing of a non-volatile memory 110 with write ability. Protected system 90 can optionally also include one or more other modules 92 in addition to module 100. Examples of suitable non-volatile memory 110 with write ability include electrically erasable programmable read only memory (EEPROM), random access memory powered with a battery, and flash memory. For the purposes of illustration, non-volatile memory 110 is assumed to be flash memory, however it should be evident that other forms of nonvolatile memory may be used mutatis mutandis.

Protected system 90 includes one or more lockable features. The lockable features can relate to memory 110, other parts of module 100, and/or other modules 92. The type of features is implementation dependent and can include inter-alia sections of memory, development support, test features, debug features, interface paths, operations such as read, write, erase and other operations that use data in memory 110, etc.

It is also assumed that each lockable feature has two levels of allowed usage, a locked level and an unlocked level. Usage means exploitation of the feature and depending on the type of feature, usage can include accessing the feature, accessing via the feature, performing the feature, etc. When the lockable feature is locked, usage of the feature is typically more restricted than when the lockable feature is unlocked or usage of the feature may be totally disabled. However in some cases, the allowable use of the feature when locked may be less restricted or enabled, for example in the case of operations which require protected system 90 to be protected prior to execution. The variation in allowable use between the locked and unlocked state is implementation dependent and can include: number and/or types of allowable interfaces, number and/or types of allowable operations (including read, write, and erase, etc), etc. For example, the lockable feature when unlocked may be accessible for all operations (e.g. read, write, erase, etc), but when locked may only be accessible for a subset of operations (e.g. read). As another example, when the lockable feature is unlocked the feature may be accessible through any interface, but when locked only accessible through less than all available interfaces.

To provide further illustrative examples, sections of memory (features) when locked may be accessible only for read operations and/or only from an internal interface. As another example, use of an external interface path (feature) may be allowable only when this feature is unlocked. As yet another example, use of an external interface path (feature) when locked may be allowable only for read operations. As yet another example, performing an erase operation on flash 110 (feature) may be allowable only when this feature is unlocked. As yet another example, performing a generation of secrets and/or security keys (feature) may be allowable only when this feature is locked. As yet another example, some or all operations performed by a particular module 92 (feature) may be allowable only when this feature is unlocked.

For the purpose of the discussion below of a particular preferred embodiment illustrated in FIG. 1, it is assumed that the features are sections of memory 110 which when locked are less accessible with respect to the number and/or type of interfaces that can be used for accessing these sections of memory 110. (i.e. sections of memory 110 when unlocked are accessible through more interfaces). Other preferred embodiments can use other types of features and/or types of variation in allowable use when locked versus unlocked mutatis mutandis.

In the illustrated preferred embodiment, the interface(s) through which sections of memory 110 can be accessed even when locked is assumed to be one or more internal interfaces. As illustrated in FIG. 1, there is one internal interface that allows processor core 120 to access flash 110 (via a core bus 122 and a flash interface 140) and to use and update the contents of flash 110 even when sections of flash 110 are locked. (The updating is sometimes subject to certain limitations as explained below). Core 120 is in some preferred embodiments embedded in module 100. Core bus 122 can be any bus that allows the transfer inter-alia of addresses, read transactions and write transactions and is configured for use with core 120. Depending on the implementation other interfaces can alternatively or in addition provide access even when sections of memory 110 are locked. For example, in other preferred embodiments, interface(s) between a host and flash 110 via a suitable host bus may be appropriately substituted or added.

In the illustrated preferred embodiment, the interface(s) through which sections of memory 110 can be accessed only when the features are unlocked is assumed to be one or more external interfaces. It is assumed that when sections are locked, no access is allowed via the external interfaces, while when unlocked all access via the external interfaces is allowed. (In alternative preferred embodiments, some operations, for example reading from a section of memory 110 may be allowed via the external interface even when the section is locked). Examples of external interfaces include JTAG interfaces and parallel interfaces.

Typically a JTAG interface is used to program flash memory 110 after memory 110 has been assembled in its application board (or as an option for a pre-assembly programming as well). This programming may be done as part of the final system manufacturing, during the debug process of the flash contents or as part of failure recovery performed by a trained technician. Typically, a parallel interface is used instead during the testing of the device as part of the manufacturing process. At this phase the 'factory parameters' are loaded into the device. A parallel interface may also be used for programming the flash memory prior to assembling it in the system, using a special memory programmer (such as those commercially available from Data I/O).

As illustrated in FIG. 1, there is one external interface that is a JTAG interface. The architecture of JTAG 160 is based on the IEEE 1149.1a standard. Operation of JTAG 160 is controlled through four pins (signals): test clock (TCK) 162, Test Data In (TDI) 164, Test Mode Select (TMS) 166, and Test Data Out (TDO) 168. (It is assumed in FIG. 1, that the optional JTAG RST signal that is part of the standard is internally generated by the power up reset circuit). It should be evident however that depending on the implementation other interfaces that provide access only when features of memory are unlocked can be added or substituted.

In the illustrated preferred embodiment, erase signal 142, write signal 144, read signal 146, addresses 152, data-in 148, and data-out 150 are transferred, as appropriate, between JTAG interface 160 and flash interface 140. Erase signal 102, write signal 104, read signal 106, addresses 114, data-in 108, and data-out 112 are transferred, as appropriate, between flash interface 140 and flash 110. Flash 110 can thereby be accessed via flash interface 140 and JTAG interface 160 and/or via flash interface 140 and core bus 122 as appropriate.

In a preferred embodiment, the desired state (locked or unlocked) of a lockable feature is reflected in the value of a corresponding word in flash memory 110 (hereinbelow "lock words"). Therefore each lockable feature is either locked or unlocked depending on the detected value of the corresponding word. Lock words are typically located in a predetermined location in flash 110, so that the words can be read by flash interface 140 in the detection process explained below.

In some preferred embodiments the value of a single lock word may reflect the desired state of a plurality of features. For example, a single lock word may reflect both whether entire flash memory 110 can be accessed by JTAG interface 160 and whether certain operations of a particular module 92 can be performed. For the ease of presentation, a single lock word will be presented below as corresponding to a single feature, however it should be understood to also include the case of a single lock word corresponding to a plurality of features.

As mentioned above, the feature type and type of variation in allowable use for the locked versus unlocked state are implementation dependent. In some preferred embodiments with a plurality of lock words, depending on the detected values of the lock words the same type of feature is locked or unlocked, in turn varying the allowable use of the feature. In alternative preferred embodiments with a plurality of lock words, different lock words can correspond to different types of features, and/or depending on the detected values of different lock words the variation in types of allowable use can be varied. For example, depending on the detected value of a first lock word the write operation can be enabled or disabled, depending on the detected value of a second lock word the access to a section of memory for the write operation can be enabled or disabled, and depending on the detected value of a third lock word the access to the write operation from an external interface can be enabled or disabled. In some cases where there is a plurality of lock words, the lock words may provide redundant protection, so that if one lock word is compromised, other lock words provide backup protection. To continue with the same example, if the first lock word is compromised so that the write operation is incorrectly enabled, the third lock word may still prevent writing from an external interface. Typically, however, a detected "unlocked" value of one lock word cannot unlock a feature that should be locked based on the detected "locked" value of another lock word.

In some preferred embodiments with a plurality of lock words, the lock words may provide identical protection, i.e. more than one lock word protects the same feature (for example the same section of memory) with the same variation in allowed use between locked and unlocked state (for example the same interfaces can only be used in the unlocked state).

For the ease of explanation, it is assumed in the illustrated preferred embodiment described below for a plurality of lock words, that depending on the detected values of the lock words, the same type of feature but not the identical feature is locked or unlocked (in the illustrated preferred embodiment, a different section of memory 110 corresponding to each lock word is locked or unlocked), in turn varying the allowed use between the locked and unlocked state (in the illustrated preferred embodiment, allowable interfaces for access).

For example in FIG. 1, the detected value(s) of the lock words may impact the access from JTAG interface 160 to flash 110. If it is desired to cut off access via JTAG interface 160 to a section of memory 110 which should be locked, access can be prevented using one or more different techniques. In one technique, the detected value of the corresponding lock word can impact the effectiveness of signals from the JTAG interface 160 including: address 152 (of section of memory), data-in signal 148, data-out signal 150, write signal 144, erase signal 142 and read signal 146. Assuming that the current address 152 is for a locked section of memory 110 and that write, erase and read are not allowed by JTAG 160 when the section is locked then although JTAG interface 160 may assert signals 144, 142, or 146, writing, erasing or reading will not occur because write signal 104, erase signal 102, or read signal 106 will not be allowed to be asserted. As another technique, test clock 162, test data in 164 and test mode select 166 may be disconnected to prevent JTAG 160 from accessing flash 110 when locked.

In order to increase the likelihood of correctly detecting the desired state (locked or unlocked) of a feature, repeated checks of the corresponding lock word are performed. Repeating the checking is a particularly suitable strategy against glitch attacks because the reading of the lock-word values and the storing of the values or information based on the values involves the transfer of data between registers and/or memory. A hacker may be able to create a malfunction (glitch attack) to impair one of the sequences of checks so that the impaired check erroneously returns an incorrect unlocked value. However it would be more difficult for the hacker to impair the entire sequence of repeated checks. Therefore an unlocked state is detected only at the end of repeated checks each returning an identical unlocked value for the lock word. Note that in the illustrated preferred embodiment there is more than one possible unlocked value for a lock word, and that a glitch attack is also identified if the returned unlocked values during the sequence of checks are not all identical. In addition, because the repeated checks allow the impaired check to stand out, a glitch attack can be identified thereby allowing appropriate action (as will be described below).

Placing a limitation on the number of repeated checks in a sequence limits the window of time in which a typical hacker would want to try to attack system 90. The hacker is typically assumed to only want to attack system 90 when there is a possibility of disturbing the checking and thereby gaining illegitimate use (i.e. typically causing allowable use of the feature to be at a predetermined unlocked level when allowable use is supposed to be at a predetermined locked level, but the converse is also possible). In some cases, the point in time when the limited sequence of checks begin may be hard to determine, thereby discouraging a hacker from attempting an attack. Even if the beginning point of time can be determined (for example the type of trigger is known), the hacker will know that after a certain point in time the checks will be completed and continuing the attack will be futile. The limitation on the number of checks in the sequence is especially useful in conjunction with increasing the minimum time before allowing an additional sequence of checks, as will be explained in detail below. In addition, the limitation on the number of checks means that resources for continuous checking and processing of the checking results are not needed. Furthermore in some preferred embodiments, the limitation on the number of checks in a sequence allows for a default assumption of a hack attack and/or locked features if and until proven otherwise by the sequence of checks. (If the number of checks were unlimited, such an assumption might imply that the consequences of locked features or a hacking attack would need to be minimal or the system operations would be unnecessarily hampered during the sequence of checks).

In the illustrated preferred embodiment, erase signals 142 and 102 allow erasure of any unlocked memory features 110. Therefore any features that are not protected by lock words can be erased at will. The lock words and corresponding memory features that are protected by lock words can be erased as long as the lock words have not been set to the locking combinations (i.e. as long as the lock word values do not correspond to the locking combinations). Continuing with the illustrated preferred embodiment once the lock words have been set to the locking combinations, writing and erasure of the lock words and preferably reading of the lock words are not allowed from any external or internal interface.

The setting of the lock word(s) to the locking combination(s) is typically performed via JTAG 160 or any other external interface, for example a parallel interface once it is desired to lock the corresponding features. In some of these preferred embodiments, core 120 does not have write access to the lock word(s) in any case. However in other embodiments, other (non-external) interfaces, for example used by core 120, may be used to set the locking combination(s)

As mentioned above, once the lock words have been set to the locking combinations in order to lock the corresponding features, erasure of the lock words and corresponding locked features is not allowed so as to protect against a hacker erasing the lock words and corresponding features and injecting a virus during a rewrite. As it is well known in the art, during manufacture of memory 110, the contents of memory 110 may take on unpredictable values, i.e. memory 110 may "wake up" with unpredictable contents. Therefore in a preferred embodiment each lock word is configured to represent the locked state only if the word contains one of a limited number of particular locking combinations of ones and zeros. If the word contains a different sequence of ones and zeros the lock word represents the unlocked state. For each lock word, the particular locking combination(s) are selected so as to minimize the probability of the lock word "waking up" with the selected locking combination(s), therefore minimizing the probability of needing to dispose of manufactured memory 110 (because as mentioned above, erasure is not allowed once the lock word value has been set to the locking combination). Assuming the lock word(s) wake up with any of the other possible sequences excluding the locking combination(s) thereof, erasure of the entire flash 110 can optionally be performed so as to bring all cells to a known value (typically "1").

The limited number of locking combinations assigned to a lock word should be small relative to the number of possible sequences for a given lock word length, in order to minimize the probability of waking up in the locked state. It should be evident that in general the lower the number of locking combinations, the lower the probability of waking up in the locked state. In the illustrated preferred embodiment described below, it is assumed that there is only a single locking combination corresponding to a lock word.

For implementations where the probability of bits waking up as a "0" or "1" is unknown or not strongly biased to either "0" or "1", a locking combination with an equal number of bits that are "1" and "0" is preferably selected for each lock word. Preferably, the distribution of "1"s and "0"s is random or pseudo random.

A sensitivity of the read operation to change values from 1 to 0 or the other way around should also be taken into consideration. In case there is sensitivity in both directions (even under different conditions and attacks) an equal number of 0 and 1's is preferably used.

For alternative implementations where there is a strong bias for the bits to wake up as a "1" or "0" value, the locking combination for each lock word should preferably include more bits with the other value. For example, if there is a strong bias for the bits to wake up as a "0", two thirds of the bits in the locking combination may be selected as "1".

In some implementations there should also be a limit on the percentage of bits in the locking combination selected as a 0 or 1 because it may be easier for a glitch attack to cause a preponderance of one value over another. Therefore even if there is a strong bias for bits to wake up as "0", the locking combination will typically not include 95% of the bits as "1".

As a minimum requirement the selected locking combination should not be the same value as any predetermined values for other purposes such as all erased or all programmed. For example if in a particular implementation flash cells when all erased are set to 1 and when all programmed are set to 0, the locking combination for each lock word should have at least one "0" and at least one "1".

In some preferred embodiments, more than one or even all lock words can have the same locking combination while in other preferred embodiments each lock word has a different locking combination.

Figure 2:
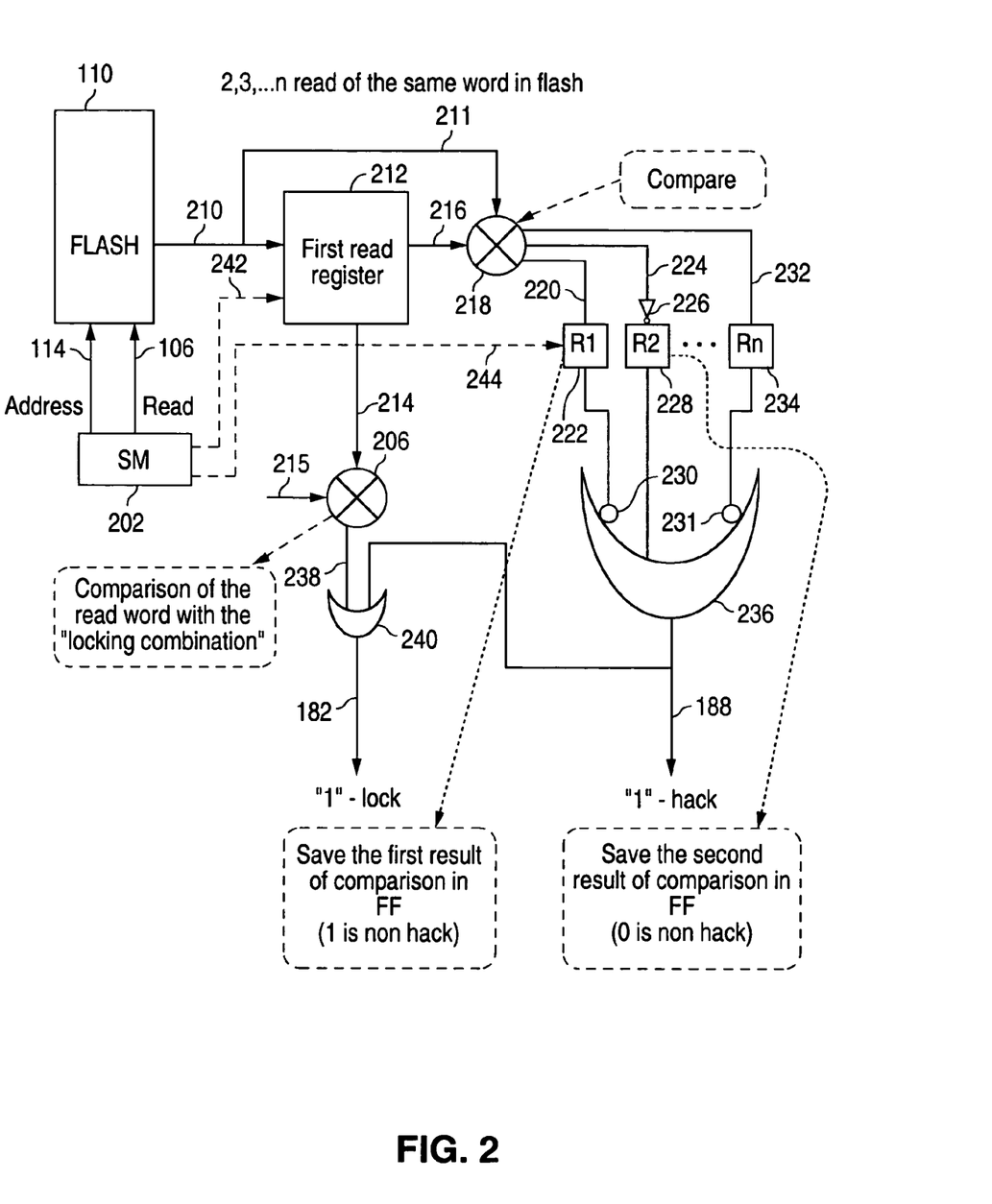
FIG. 2 is a circuit for multi-sampling the value of a single lock word, in accordance with a preferred embodiment of the present invention.
Figure 3:
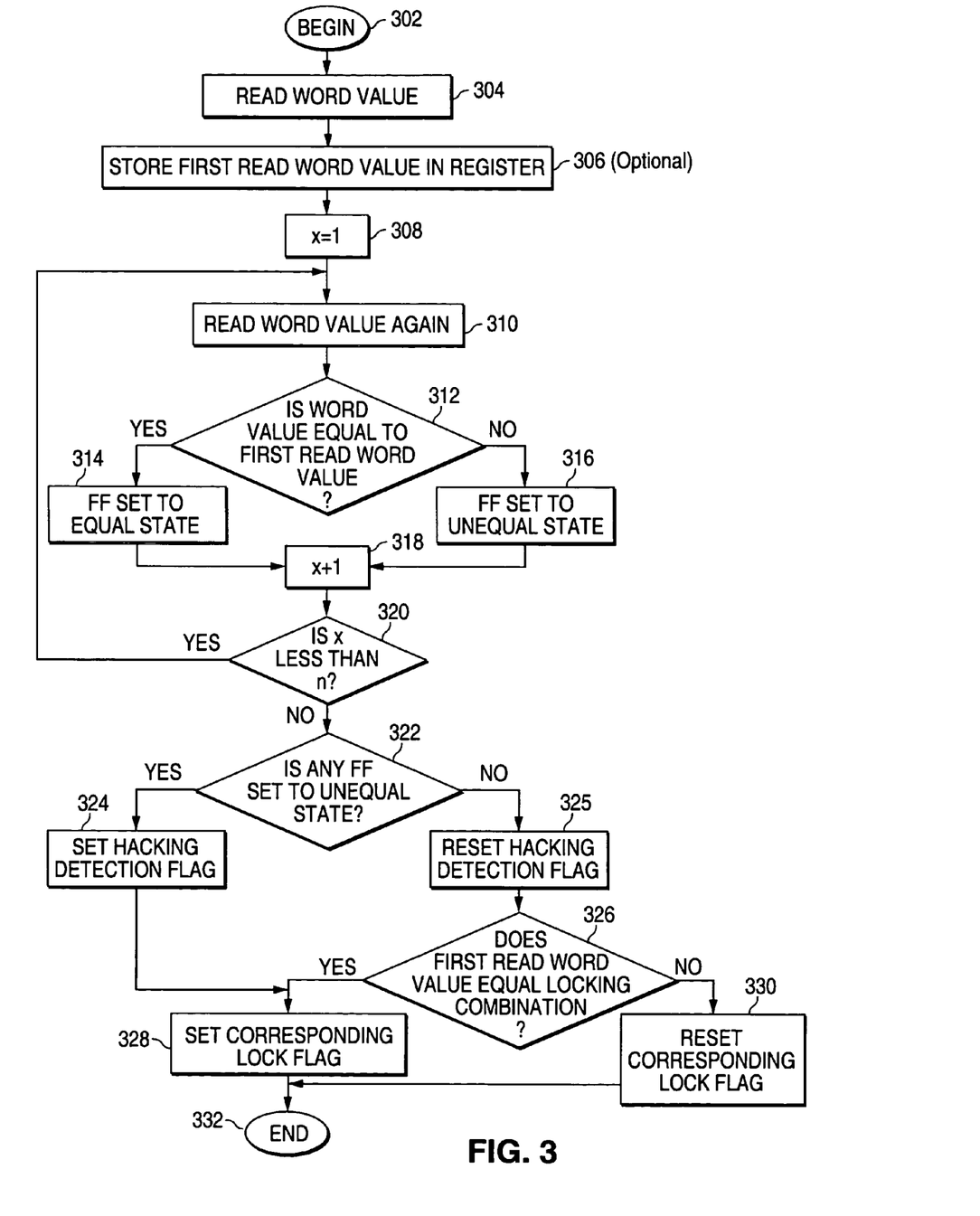
FIG. 3 is a flowchart of a multi-sampling method, in accordance with a preferred embodiment of the present invention.
Figure 4:
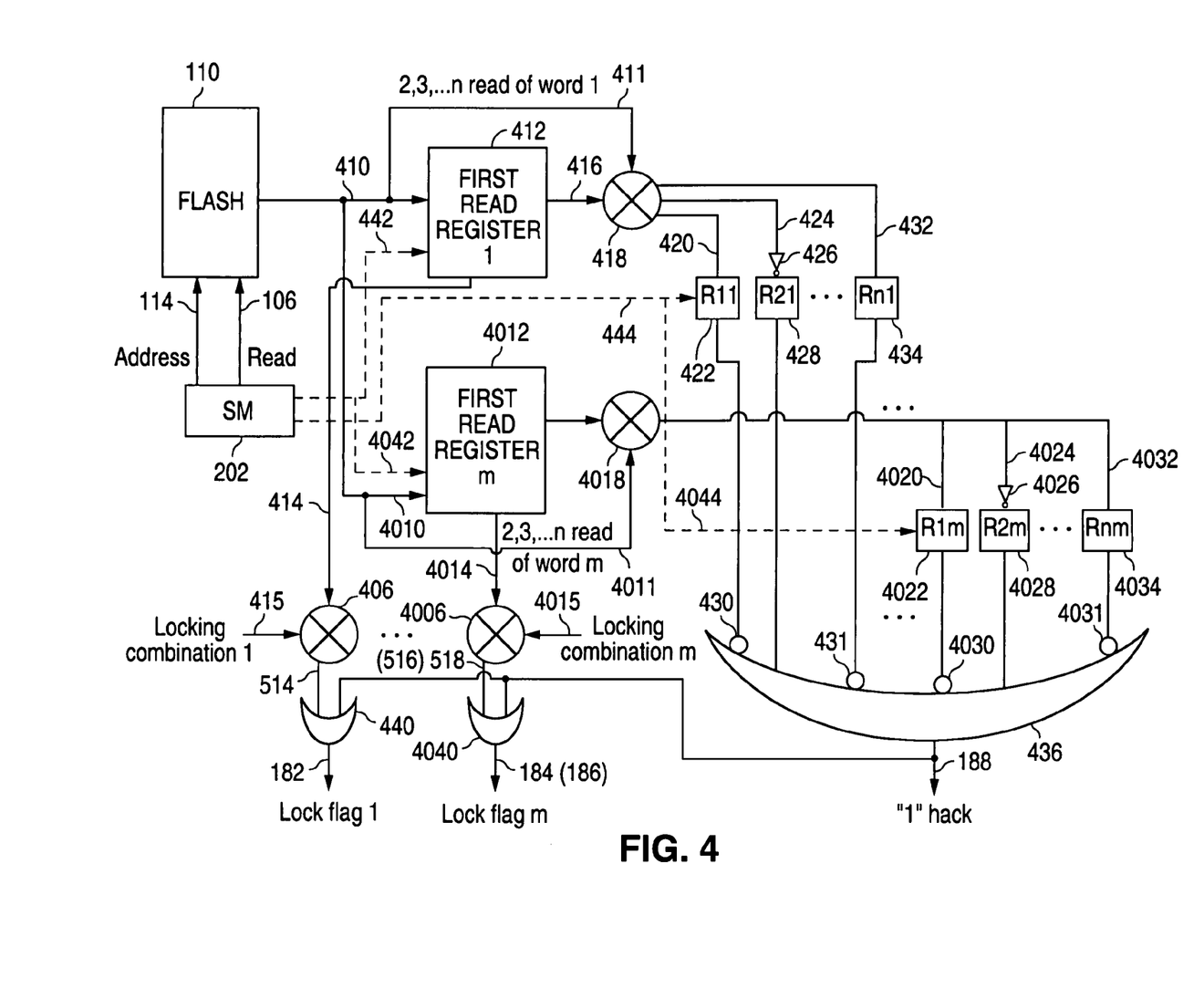
FIG. 4 is a circuit for multi-sampling the values of a plurality of lock words, in accordance with another preferred embodiment of the present invention.
Figure 5:
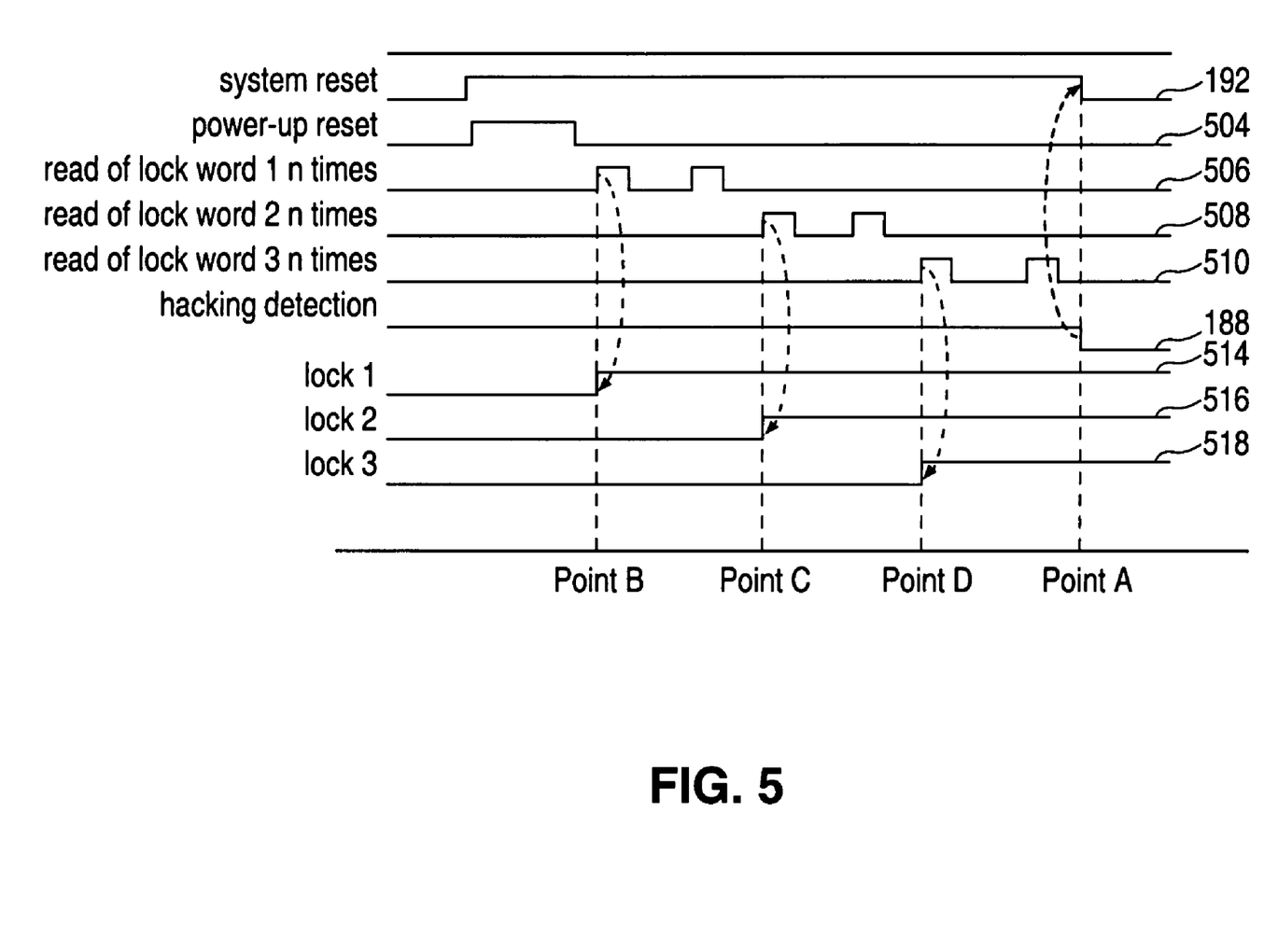
FIG. 5 is a timing diagram of some signals involved in the multi-sampling, in accordance with a preferred embodiment of the present invention.
Figure 6:
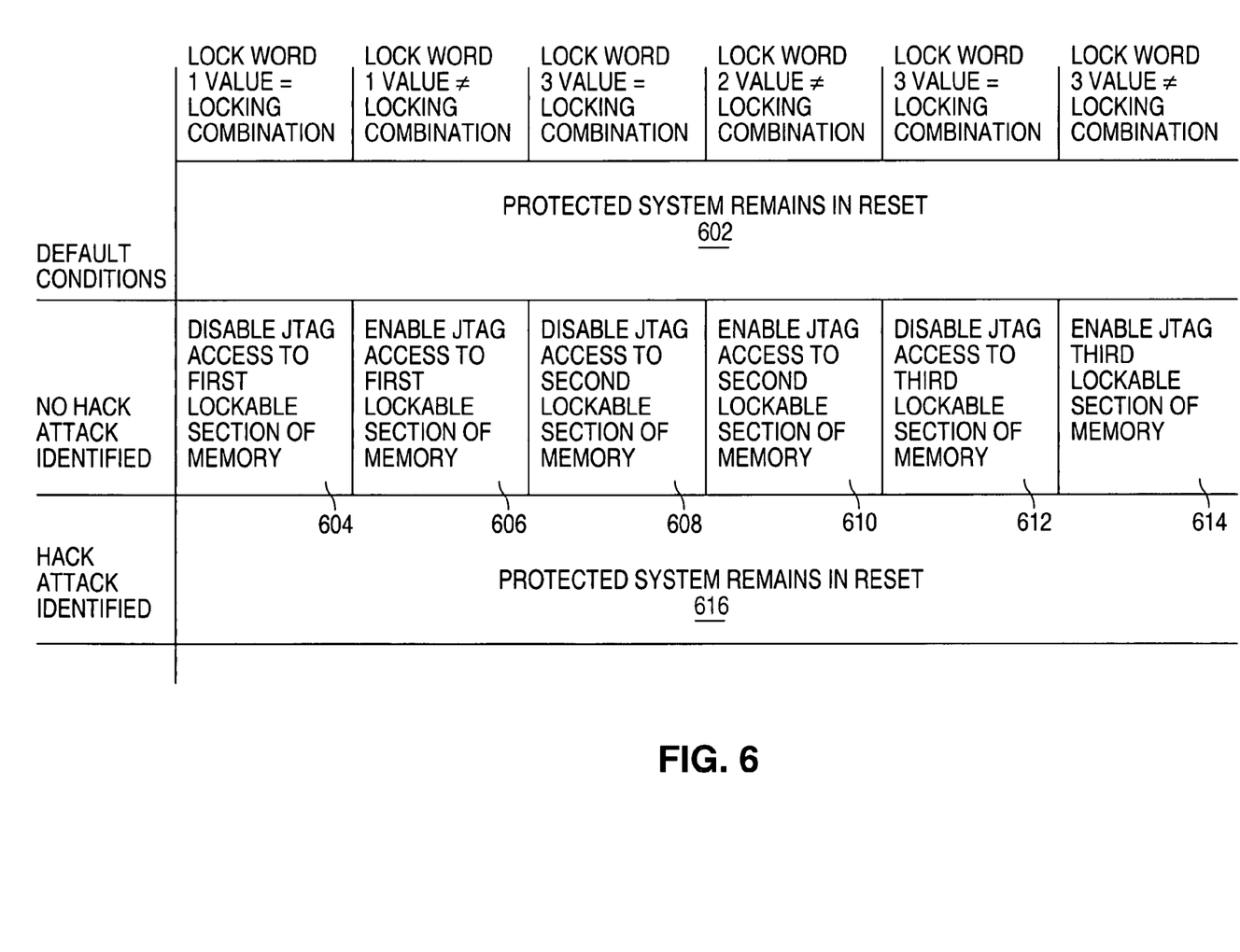
FIG. 6 is a table listing consequences resulting from the multi-sampling as well as default outcomes, in accordance with a preferred embodiment of the present invention

FIGS. 2, 3, and 4 illustrate preferred embodiments of the systems and methods for performing the limited repeated checking (multi-sampling) of the lock words. FIG. 5 illustrates a preferred embodiment of the timing of the checking, and FIG. 6 illustrates a preferred embodiment of the consequences of the checking as well as default outcomes. It should be evident however that in different preferred embodiments the systems, methods, timing, default outcomes and/or consequences may vary and that the invention is not bound to the preferred embodiments illustrated in FIGS. 1 through 6. The logical values of "1" and "0" are used throughout the discussion below for ease of explanation and it should be evident that they can be interchanged mutatis mutandis.

FIG. 2 illustrates a part of flash interface 140, according to a preferred embodiment of the present invention. The elements shown in FIG. 2 are for the purpose of illustration and may be replaced by logical equivalents in other preferred embodiments. FIG. 3 illustrates a flow chart of a corresponding method, according to a preferred embodiment of the present invention. The sequence of steps shown in FIG. 3 may be varied in other preferred embodiments.

In FIG. 2, only one lock word is used. For ease of explanation the value of the lock word is assumed to reflect the desired locked or unlocked state of a single feature that is assumed here to be the entire flash 110. A state machine 202 provides the address 114 of the lock word and read signal 106 to flash 110. The value of the lock word is read for the first time (step 304) and stored in first read register 212 (step 306). State machine 202 provides the write signal 242 for first read register 212 to write the value of the lock word. (If the lock word includes only one bit, the first read value need not be stored and step 306 can be omitted). For the next n−1 times, state machine 202 again provides the address 114 of the lock word and read signal 106 to flash 110 and the value of the lock word is again read (step 310). Each reading of the value of the lock word is compared with a first reading stored in read register 212 by comparator 218 (step 312). The results of the comparisons are stored in logic circuitry. For example, it is assumed in the illustrated preferred embodiment that each result of the comparison is stored in a different flip flop 222, 228, . . . 234 (step 314 for an equivalent comparison i.e. a match or step 316 for a non-equivalent comparison i.e. a non-match). State machine 202 provides the write signals to each flip flop 222, 228, . . . 234 in turn.

The minimum number of readings (n) performed is two readings (mandating one flip flop), however in some preferred embodiments, more than two readings may be performed for additional security or for other consideration. For example, in a tested implementation of module 100, ten readings performed well.

In some preferred embodiments of the present invention, an equivalent comparison result is stored as a different value for different flip-flops 222, 228, 234 (and similarly a non-equivalent result is stored differently). For example, for certain comparisons, an equivalent result (i.e. first read is sufficiently similar to subsequent read) is stored as a "1" in the corresponding flip flop, while for other comparisons, an equivalent result is stored as a "0" in the corresponding flip flop. (In FIG. 2, illustrated flip flop 228 stores a "0" for an equivalent result and the other illustrated flip flops 222 and 234 store a "1" for an equivalent result. Non-equivalent results are stored as a "1" in flip flop 228 and as a "0" in flip-flops 222 and 234). The variation in storing provides additional protection from a malicious attack attempting to force all flip-flops 222,228 . . . 234 to the same value.

If any of the comparison results yield a non-equivalent result, the "or" gate 236 causes a hacking detection flag 188 to be set to "1" which is preferably provided to reset/configuration 180 (step 324). In the illustrated embodiment a set hacking detection flag 188 means that a hack attack was identified. Otherwise hacking detection flag 188 is reset to "0" (step 325), meaning that no hack attack was identified. It should be noted that a hack attack is identified even if all readings reflect unlocked values (i.e. not the predetermined locking combination) for the lock word but the unlocked values are not identical for all readings.

The first read value of the word 214 is compared with the predetermined locking combination 215 (typically built into the circuit). If the comparison is positive (i.e. the first read value of the lock word equals the locking combination), lock flag 182 is set. Considering that hack flag 188 is fed into "or" gate 240, lock flag 182 is also set if hacking flag 188 is set (step 328). Otherwise lock flag 182 is reset (step 330).

As will be explained further below, a set hacking detection flag 188 may in some cases cause allowable use of the lockable feature to be in accordance with the locked state (regardless of the state of lock flag 182). In these cases, the setting of lock flag 182 through "or" gate 240 when hacking flag 188 is set may therefore be omitted.

In an alternative preferred embodiment to the illustrated preferred embodiment of FIG. 2, a plurality of lock words which protect the same feature are stored in flash 110. The value of each subsequent word is read once and compared to the value of the first read word.

FIG. 4 illustrates a preferred embodiment of a part of flash interface 140 for more than one lock word, i.e. for m lock words where m is greater than 1. In the illustrated embodiment, for ease of explanation it is assumed that each lock word protects a different section of flash 110. The elements shown in FIG. 4 are for the purpose of illustration and may be replaced by logical equivalents in other preferred embodiments.

State machine 202 controls the repeated checks (n≧2) for each of the m lock words. For each lock word, state machine 202 provides the address 114 of the lock words and read signal 106 to flash 110. The value of each lock word is read for the first time (step 304). State machine 202 provides the write signal 442 . . . 4042 to first read register 412 . . . 4012 to write the first read value of each lock word (step 306) (For any lock words of only one bit, step 306 may be omitted). For each lock word, for the next n−1 times, state machine 202 again provides the address 114 of the lock word and read signal 106 to flash 110 and the value of the lock word is again read (step 310). Each read value of each lock word is compared by corresponding comparator 418 . . . 4018 with the corresponding first reading stored in the corresponding read register 412 . . . 4012 (step 312). Results of the comparison are stored in logic circuitry. For example, it is assumed in the illustrated preferred embodiment that each result of the comparison is stored in a different flip flop within the appropriate flip flop configuration 422,428 . . . 434 . . . 4022,4028 . . . 4034 (step 314 for an equivalent comparison or step 316 for a non-equivalent comparison). As explained above with reference to FIG. 2, in some preferred embodiments, some of flip-flops 422,428 . . . 434 . . . 4022,4028 . . . 4034 may be configured to store different values from the other flip flops 422,428 . . . 434 . . . 4022,4028 . . . 4034 for an equivalent comparison (and similarly different values from one another for a non-equivalent comparison). It should also be noted that for each group of flip flops 422, 428 . . . 434 . . . 4022,4028 . . . 4034, corresponding to a different lock word, the order in which the different values for an equivalent comparison is stored may differ (for example in one group, even flip flops may store an equivalent comparison as '1' whereas in another group, odd flip flops may store an equivalent comparison as '1').

For each lock word, comparison of the first reading of the value of each lock word with the corresponding locking combination 415 . . . 4015 by comparators 406 . . . 4006 generates a separate locked/unlocked flag. Assuming m=3, as in FIG. 1, three locked/unlocked flags are generated: 182, 184, 186 corresponding to three sections of memory 110. A lock flag is set if a first reading of a corresponding lock word returns the same value as the locking combination of that lock word. All lock flags (assuming m=3, lock flags 182, 184, 186) are also set if hacking flag 188 is set (step 328). If the first read value does not equal the corresponding locking combination and the hack flag is not set, then the corresponding lock flag is reset (step 330).

In the illustrated preferred embodiment of FIG. 4, only one hack signal 188 results from a single "or" gate 436, meaning that a hack attack affecting any lock word engenders identical consequences. If any of flip-flops 422,428 . . . 434 . . . 4022, 4028 . . . 4034 are set to the non-equivalent state, a hack attack is identified and hack flag 188 is set to 1 (step 324). If all flip flops 422, 428 . . . 434 . . . 4022, 4028 . . . 4034 are set to the equivalent state then no hack attack is identified and hack flag 188 is reset to 0 (step 325).

As was discussed with reference to FIG. 2, alternative preferred embodiments to that illustrated in FIG. 4 include preferred embodiments where hacking detection flag 188 is not fed into "or" gates 440 . . . 4040, and preferred embodiments where multiple lock words in flash 110 protect the same feature. In the latter case, the value of each of the subsequent words corresponding to the same feature is read once and compared to the value of the first read "same feature" word.

In alternative preferred embodiments to the preferred embodiment illustrated in FIG. 4, some lock words can be read more times than other lock words (i.e. n representing the number of readings may not be the same for all lock words). For example lock words corresponding to certain more sensitive features may be read many times while lock words for less sensitive features are read only a few times.

In alternative preferred embodiments to the preferred embodiment illustrated in FIG. 4, there may be more than one state machine for controlling the reading and writing of the lock words. In alternative preferred embodiments to FIG. 4 where all lock words have the same locking combination, all comparators 406 . . . 4006 can be replaced by one comparator. In alternative preferred embodiments to FIG. 4, there may be a plurality of hacking detection flags 188 resulting from the comparison of lock word readings. For example, in a particular preferred embodiment, it may be desirable to only lock a feature whose lock word has been detected as compromised. In that case, each hacking detection flag 188 resulting from readings of a different lock word is differentiated from other hacking detection flags 188 and only fed to the corresponding "or" gate 440 . . . 4040. As another example, in a particular preferred embodiment, the increased severity of compromising certain lock words and thereby compromising certain features may be reflected in differentiable hack flag(s) 188 which when set cause more severe consequences than the setting of other hack flags 188.

In alternative preferred embodiments to the illustrated preferred embodiments discussed in relation to FIGS. 2 and 4, for some or all of the lock words, one or more of the subsequent read values of a lock word can be compared to the locking combination instead of or in addition to the first read value. Similarly, instead of comparing each subsequent read value to the first read value, the read values can be compared in a different manner. For example, the second read value can be compared to the first, the third read value to the second, etc. As another example, the second read value can be compared to the first, the third to the first, the fourth to the second, etc. It should be evident that many different comparison sequences are possible which would detect a hack attack.

In an alternative preferred embodiment to the illustrated preferred embodiments discussed in relation to FIGS. 2 and 4, core 120 may emulate the operations of the detection hardware of flash interface 140. In this preferred embodiment, for each lock word, core 120 reads the lock word values from flash 110 (via flash interface 140 and core bus 122). Core 120 compares the read lock word values with one another and if identical, determines there is no hack attack and if not identical determines that there is a hack attack. Core 120 also compares the first read word value with the locking combination to determine if the desired state is locked or unlocked.

These operations can be emulated by core 120, for example, immediately upon power up reset of system 90.

The timing of the multi-sampling can vary depending on the implementation. In some cases, the beginning of the multi-sampling can be triggered by a time variable (for example, every fixed interval of time, the sequence of checks begins). In other cases the trigger can be an event. For example, in the preferred embodiment illustrated in FIG. 5, the trigger to begin multi-sampling is the power up reset signal 504.

The duration of the multi-sampling (i.e. the duration between the first sampling and the last sampling in the sequence) can vary depending on the preferred embodiment. In some cases, it may be advantageous to have a short duration, for example when certain actions are inhibited throughout the duration of the multi-sampling.

The delay between two samples of a multi-sampling sequence may be constant or vary within the sequence. For example in some cases it may be advantageous for the delay between samples to vary in order to protect against a glitch attacker trying to synchronize the glitch attacks with the samplings.

In some preferred embodiments there may not be a minimum required wait between the end of one multi-sampling sequence and the beginning of a new multi-sampling sequence. In other preferred embodiments there may be a minimum wait. In some cases, the minimum wait may be variable. For example if a hack attack is identified because hacking flag 188 is set, the minimum wait may be increased in order to discourage a hacker from continuing to attack. For example, an element with a long discharge time such as a capacitor (R-C relay) can be used to lengthen the time before a new sequence of multi-sampling can begin.

FIG. 5, shows a timing diagram of the multi-sampling, according to a preferred embodiment of the present invention. In the illustrated preferred embodiment, the multi-sampling is triggered by a power up reset signal 504. Upon assertion of a power-up reset signal 504 which resets (all or part of) protected system 90, a system reset signal 192 keeps the reset part of protected system 90 in reset, if and until hacking flag 188 put to "0" (i.e. if and until the multi-sampling is completed with no hack attack identified). Point A represents a point in time in the illustrated timing diagram when the multi-sampling ends with no hack attack identified and therefore system reset signal 192 is put to "0", allowing protected system 90 to exit reset.

It is assumed in the preferred embodiment illustrated in FIG. 5 that three lock words are used (m=3) and therefore there are three read signals 506, 508 and 510. It is also assumed that n readings are performed for each of the three lock words. Each lock word is read n times before the next lock word is read. (Depending on address 114, signal 106 reads the corresponding lock word. When read signal 106 is reading lock word 1, read signal 106 can be thought of as defining read 1 signal 506; when read signal 106 is reading lock word 2, read signal 106 can be thought of as defining read 2 signal 508; when read signal 106 is reading lock word 3, read signal 106 can be thought of as defining read 3 signal 510). Because m is assumed to be 3, there are three comparators 406 . . . 4006 which output signals 514, 516, and 518—see FIG. 4. Depending on the results of the comparisons performed by comparator 406 . . . 4006 for the first read value of each lock word with the locking combinations 415 . . . 4015, lock comparison signals 514, 516, 518 have the value "1" (i.e. first read value equals locking combination) or "0" (i.e. first read value does not equal locking combination).

As shown in FIG. 5, for all three lock words the comparison of the first read values with the corresponding locking combination results in equivalency (i.e. desired state as per first reading for each of the corresponding features is the locked state). Points B, C, and D represent the respective points in time when each lock word is read for the first time and compared to the corresponding locking combination, resulting in equivalency or non-equivalency.

In alternative preferred embodiments to the illustrated preferred embodiment of FIG. 5, the readings of the value of one lock word can be interleaved with the readings of the value(s) of one or more other lock words and/or the values of some lock words may be read more times than others.

In alternative preferred embodiments to that illustrated, the delay between any two samples of a multi-sampling sequence may vary.

In alternative preferred embodiments to that illustrated, multi-sampling begins independently of power up reset signal 504. In alternative preferred embodiments to that illustrated, the first multi-sampling occurs upon assertion of power up reset 504 and if the first multi-sampling detects no hacking, other multi-sampling sequences may occur later, for example upon changes in lock conditions or upon writing to flash 110. In alternative embodiments to that illustrated, if there is more than one lock word the readings of some of the lock words can be performed when protected system 90 is not in reset. In some of these alternative embodiments, resetting protected system 90 only occurs if and when hacking flag 188 is set by the multi-sampling (i.e. initially assume no hacking and only if proven otherwise reset system 90).

It should be noted that unrelated to the multi-sampling, reset/configuration 180 (FIG. 1) typically generates outputs used for initialization and configuration of protected system 90, including enabling and disabling features of system 90. The illustrated preferred embodiment takes advantage of some or all of the outputs of reset/configuration 180 for activating appropriate consequences based on the observations resulting from the multi-sampling (i.e. hack or no hack attack identified, locked or unlocked is desired state of feature). It is assumed for ease of explanation of the illustrated preferred embodiment that because there are three lock words, four outputs 192, 194, 196 and 198 of reset/configuration 180 are relevant when activating the appropriate consequences of the multi-sampling. Hack detection signal 188 and the lock flags 182, 184, and 186 are inputted into reset configuration 180 and based inter-alia on the values of signals 182, 184, 186 and 188 reset/configuration 180 sets/resets outputs 192, 194, 196 and 198. In the illustrated embodiment, signal 192 activates appropriate consequences based on the detection or non-detection of a hack attack, and signals 194, 196, and 198 activate appropriate consequences based on the detected locked or unlocked value of the first, second and third lock words respectively.

In alternative preferred embodiments, signals 182, 184, 186 and 188 may directly activate the appropriate consequences of the observations resulting from the multi-sampling. Examples of consequences are described further below.

For ease of explanation in the discussion below, it is assumed that outputs of reset/configuration 180 are used to activate the appropriate consequence. Outputs 192, 194, 196 and 198 are assumed to activate default outcomes under default conditions (i.e. when there is insufficient basis to activate appropriate consequences based on the observations). Default conditions are implementation dependent and may include for example, the complete duration of any sequence of checks, conditions under which observations have not yet been concluded, and/or conditions under which the concluded observations are not known by reset/configuration 180. In some embodiments, the extent of default conditions can also vary for different parameters. For example, default conditions leading to a default hack/no hack attack outcome may continue throughout the complete duration of any sequence of checks while default conditions leading to a default locked/unlocked outcome may continue only through part of the sequence of checks.

The default outcomes are also implementation dependent. In some cases it may be preferable that the default outcomes are similar to the consequences activated when a hacking attack and a desired locked state are identified (i.e. assume hack attack and assume allowable use of features as per locked state if and until otherwise determined). In other cases, the default outcomes may be similar to the consequences activated when no hack attack is identified and a desired unlocked state is detected (i.e. assume no hack attack and assume allowable use of features as per unlocked state if and until otherwise determined). In other cases, a combination of the above may be implemented, for example, in the default case assume allowable use of features as per locked state and assume no hack attack. In still other cases, the default outcomes may be different than the consequences activated based on the observations resulting from the multi-sampling. For example, during the sequence of checks some restrictions may be in place that are removed if no hack attack is identified or augmented if a hack attack is identified through the sequence of checks.

In addition, the appropriate consequences to be activated are implementation dependent and relate to the protection profile of protected system 90. Examples of appropriate consequences of an identified hack attack (i.e. hack flag 188 set to "1") include inter-alia one or more of the following: varying the allowable use of one or more lockable features from a predetermined unlocked level to a predetermined locked level, maintaining the allowable use of one or more lockable features at a predetermined locked level, varying the allowable use for one or more lockable features corresponding to lock words whose dissimilar readings allowed the attack to be identified from a predetermined unlocked level to a predetermined locked level, maintaining the allowable use of one or more lockable features corresponding to lock words whose dissimilar readings allowed the attack to be identified at a predetermined locked level, stopping or continuing to bar erasure or programming of lock words, stopping or continuing to bar use of some or all non-lockable features of module 100, stopping or continuing to bar use of some or all non-lockable features of some or all of other modules 92, causing protected system 90 to go into reset or maintaining protected system 90 in reset, preventing or continuing to prevent use of locked features which is usually allowed when features are locked, preventing or continuing to prevent use of unlocked features which is usually allowed when features are unlocked, reporting the attack for example by sending an alert, increasing the minimum wait between checking sequences, etc.

Similarly, the consequences of identification of no hack attack (hack flag 188 set to "0") include inter-alia one or more of the following: allowing or continuing to allow use of some or all non-lockable features of module 100, allowing or continuing to allow use of some or all non-lockable features of some or all of other modules 92, allowing protected system 90 to exit reset, etc. As mentioned above, in some preferred embodiments, a plurality of hacking flags 188 may be used with differing consequences.

Typically, the consequences of detecting that the desired state for a feature is the locked state include varying the allowable use of the feature to a predetermined locked level or maintaining the allowable use of the feature at a predetermined locked level. Similarly, the consequences of detecting that the desired state for a feature is the unlocked state include varying the allowable use of the feature to a predetermined unlocked level or maintaining the allowable use of the feature at a predetermined unlocked level. The difference between allowable use of the feature in accordance with a predetermined unlocked level and in accordance with a predetermined locked level is implementation dependent as was described above, with allowable use of lockable features typically more restricted or disabled at the locked level but in some cases allowable use of a lockable feature may be less restricted or enabled at the locked level.

In some preferred embodiments, if the consequences of an identified hack or no hack attack and the consequence of a detected locked or unlocked state are in conflict, the more conservative of the consequences may prevail. For example, assume that in FIG. 2, signal 188 is not fed into 'or' gate 240, but that if a hack attack is identified, access to the corresponding lockable flash 110 by JTAG 160 is disabled as a consequence. Assume that (i) a hack attack is identified and (ii) a desired unlocked state is detected by comparator 206. In this example, access will be disabled (more conservative), even though the detection of a desired unlocked state would normally have led to access being enabled.

For preferred embodiments where protected system 90 is in reset (as a default outcome and/or as a consequence of the observations), use of more or less features can be inhibited during reset. For example, in some cases when protected system 90 is in reset, only the operations involved in checking the values of the locked words (for example method 3) may be allowed to be performed, whereas in other cases, other limited operations may be allowed. The extent of allowable use of features may in some cases depend on the sensitivity of the features and/or the breadth of protected system 90. For example, if protected system 90 includes many other modules 92 not related to flash 110, continued operation of those modules 92 may be considered safe either until a hack attack is conclusively identified or even after a hack attack is identified. As another example, if one of modules 92 is configured to report a malicious attack, the reporting module may be allowed to function while protected system 90 is in reset.

FIG. 6 is a table illustrating consequences of the observations resulting from the multi-sampling as well as default outcomes, according to a preferred embodiment of the present invention. In the illustrated preferred embodiment, it is assumed that multi-sampling occurs upon assertion of power up reset signal 504. Default conditions are assumed to continue from power up reset until the end of the multi-sampling. Until the end of multi-sampling, a hack attack is assumed and the entire protected system 90 other than the state machine of JTAG 160 is kept in reset by signal 192 (section 602 of table 600). At the end of the multi-sampling, if no hack attack is identified, signal 192 allows protected system 90 to exit reset, otherwise signal 192 keeps protected system 90 in reset (section 616 of table 600). In addition, until the end of the multi-sampling, disable signals 194, 196 and 198 disable read/write access from JTAG 160 to sections of memory 110 corresponding to the first, second and third lock word, respectively. If at the end of multi-sampling a desired unlocked state for the corresponding section(s) of memory 110 is detected (in this illustrated embodiment implying that first read value does not equal locking combination and no hack attack identified), enable signals 194, 196 and/or 198 enable read/write access to that section of memory 110 from JTAG 160 (sections 606, 610, and/or 614 of table 600). For sections of memory where a desired locked state is detected but no hack attack is identified (i.e. first read value equals locking combination), disable signals 194, 196 and/or 198 continue to disable read/write access to that section of memory 110 from JTAG 160 (sections 604, 608, and/or 612 of table 600).

Continuing with the illustrated preferred embodiment, assume that as a consequence of a hack attack identified by the multi-sampling, protected system 90 remains in reset after the end of the multi-sampling. In a preferred embodiment, in order to exit from the reset state the power may be cycled, for example by turning off and on protected system 90, thereby restarting the reset sequence. As mentioned above, an element can be added to force delay of the power cycling, for example a capacitor with a long discharge time, thereby discouraging a hacker from continuing to attack.

It is possible that in some cases a false hack attack is identified, i.e. variation in the multi-samples that is not caused by a malicious attack. False positives are more likely to occur for a new flash memory 110 where the contents of flash 110 are as yet unknown. However, these false positives are rare, and can generally be corrected by adapting the environment, for example by slightly increasing or decreasing the supply voltage.

It should also be noted that in some cases where the trigger for the multi-sampling is power reset signal 504 the multi-sampling may end prior to the end of the total reset sequence of protected system 90. In some of these cases, as soon as a desired unlocked status is detected, the appropriate consequence may proceed without waiting for the reset sequence to be completed. Similarly in some of these cases, as soon as no hack attack is identified by the multi-sampling, the appropriate consequence may proceed (although it should be evident that in some instances the reset sequence may override the enabling of the appropriate consequence).

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention also contemplates at least one mask that includes topographic information to implement the method of the invention.

Although the invention has been described with respect to a limited number of embodiments, it will be appreciated that many variations, modifications and other applications of the invention may be made herein without departing from the spirit and scope of the invention in its broadest form.

What is claimed is:

1. A method of operating a protected system to identify a hack attack, said protected system including a nonvolatile memory having write ability, at least one lockable feature, and at least one lock word corresponding to said at least one lockable feature, said method comprising the steps of:
   (i) reading a value of each of said at least one lock word from said nonvolatile memory at least two times, and
   (ii) for each of said at least one lock word, selectively identifying a hack attack in response to comparing all of said at least two read values.

2. A method for identifying a hack attack in a protected system, comprising:
   reading a value of a lock word from a memory at least two times, the lock word associated with a lockable feature; and
   identifying a hack attack based on the at least two read values.

3. The method of claim 2, wherein identifying a hack attack comprises:
   comparing each of the read values to another of the read values; and
   identifying a hack attack when the comparing yields a non-match between at least two of the read values.

4. The method of claim 2, wherein:
   the lockable feature is locked when the lock word has a value equal to a locking combination; and
   identifying a hack attack comprises:
      comparing each of the read values to the locking combination; and
      identifying a hack attack when the comparing yields a non-match between at least one of the read values and the locking combination.

5. The method of claim 2, wherein:
   the lockable feature is locked when the lock word has a value equal to a locking combination; and
   identifying a hack attack comprises:
      comparing each of the read values to another of the read values;
      identifying a hack attack when the comparing yields a non-match between at least two of the read values;
      comparing at least one of the read values to the locking combination when all of the read values match; and
   identifying a hack attack when the comparing yields a non-match between the at least one read value and the locking combination.

6. The method of claim 2, wherein:
   the lockable feature is locked when the lock word has a value equal to a locking combination; and
   identifying a hack attack comprises:
      comparing each of a first plurality of read values to one of the locking combination and to a read value of a second plurality of read values; and
      storing results of the comparisons, wherein a match result for at least one first comparison is stored as a zero and a match result for at least one second comparison is stored as a one.

7. The method of claim 2, wherein:
   the lockable feature is locked when the lock word has a value equal to a locking combination; and
   access to the feature when locked is restricted by at least one of limiting the operations that can be performed involving the feature and limiting interfaces that may be used to communicate with the feature.

8. The method of claim 2, wherein multiple lock words are associated with the lockable feature, wherein at least one of the lock words controls access to the lockable feature based on a value assigned to another of the lock words associated with the feature.

9. The method of claim 2, wherein the lockable feature comprises one of a hardware component, a portion of a hardware component, and a function that can be executed.

10. The method of claim 2, wherein the lockable feature is locked when the lock word has a value equal to a locking combination; and
   further comprising setting the locking combination.

11. The method of claim 10, wherein:
   the locking combination comprises a plurality of bits; and
   setting the locking combination comprises setting the locking combination to have an equal number of bits set to a value of zero and bits set to a value of one.

12. The method of claim 10, wherein:
the locking combination comprises a plurality of bits; and
setting the locking combination comprises setting the locking combination to have a specified percentage of bits set to a value of zero or one.

13. The method of claim 2, further comprising performing one or more actions in response to identifying a hack attack.

14. The method of claim 13, wherein the one or more actions comprise one or more of:
setting allowable use of the lockable feature to a predetermined locked level;
preventing alteration and deletion of the lock word;
causing the protected system to perform a reset; and
reporting the hack attack.

15. A system for identifying a hack attack in a protected system, comprising:
a memory containing a lock word associated with a lockable feature;
a state machine operable to generate one or more signals causing a value of the lock word to be read at least twice from the memory;
a comparing unit operable to generate one or more comparison signals using the at least two read values; and
a hacking detector operable to identify a hack attack based on the one or more comparison signals.

16. The system of claim 15, wherein the comparing unit generates the one or more comparison signals by:
comparing each of the read values to another of the read values; and
generating a comparison signal for each comparison, wherein each comparison signal identifies whether the compared read values match.

17. The system of claim 15, wherein:
the lockable feature is locked when the lock word has a value equal to a locking combination; and
the comparing unit generates the one or more comparison signals by:
comparing each of the read values to the locking combination; and
generating a comparison signal for each comparison, wherein each comparison signal identifies whether the compared read value matches the locking combination.

18. The system of claim 15, further comprising a plurality of flip-flops operable to store the comparison signals from the comparing unit.

19. The system of claim 18, wherein:
each comparison signal represents a result of a comparison between a first read value and one of a locking combination and second read value; and
a match result for at least one first comparison is stored as a zero in at least one of the flip-flops and a match result for at least one second comparison is stored as a one in at least one other of the flip-flops.

20. The system of claim 15, wherein:
the comparing unit comprises one or more comparators; and
the hacking detector comprises an OR gate.

21. A method for identifying hack attacks against a protected system, the method comprising:
reading a value of a lock word from a memory at least two times, the lock word associated with a lockable feature; and
identifying a hack attack based on the at least two read values.

22. The method of claim 21, wherein identifying a hack attack comprises:
comparing each of the read values to another of the read values; and
identifying a hack attack when the comparing yields a non-match between at least two of the read values.

23. The method of claim 21, wherein:
the lockable feature is locked when the lock word has a value equal to a locking combination; and
identifying a hack attack comprises:
comparing each of the read values to the locking combination; and
identifying a hack attack when the comparing yields a non-match between at least one of the read values and the locking combination.

24. The method of claim 21, wherein:
the lockable feature is locked when the lock word has a value equal to a locking combination; and
identifying a hack attack comprises:
comparing each of the read values to another of the read values;
identifying a hack attack when the comparing yields a non-match between at least two of the read values;
comparing at least one of the read values to the locking combination when all of the read values match; and
identifying a hack attack when the comparing yields a non-match between the at least one read value and the locking combination.

25. The method of claim 21, wherein:
the lockable feature is locked when the lock word has a value equal to a locking combination; and
identifying a hack attack comprises:
comparing each of the read values to one of the locking combination and another of the read values; and
storing results of the comparisons, wherein a match result for at least one comparison is stored as a zero and a match result for at least one other comparison is stored as a one.

26. A program storage device readable by machine, tangibly embodying a program of instructions executable by the machine to:
read a value of a lock word from a memory at least two times, the lock word associated with a lockable feature; and
identify a hack attack based on the at least two read values.

27. The program storage device of claim 26, wherein the program of instructions is operable to identify a hack attack by:
comparing each of the read values to another of the read values; and
identifying a hack attack when the comparing yields a non-match between at least two of the read values.

28. The program storage device of claim 26, wherein:
the lockable feature is locked when the lock word has a value equal to a locking combination; and
the program of instructions is operable to identify a hack attack by:
comparing each of the read values to the locking combination; and
identifying a hack attack when the comparing yields a non-match between at least one of the read values and the locking combination.

29. The program storage device of claim 26, wherein:
the lockable feature is locked when the lock word has a value equal to a locking combination; and
the program of instructions is operable to identify a hack attack by:

comparing each of the read values to another of the read values;
identifying a hack attack when the comparing yields a non-match between at least two of the read values;
comparing at least one of the read values to the locking combination when all of the read values match; and
identifying a hack attack when the comparing yields a non-match between the at least one read value and the locking combination.

30. The program storage device of claim 26, wherein:
the lockable feature is locked when the lock word has a value equal to a locking combination; and
the program of instructions is operable to identify a hack attack by:
comparing each of the read values to one of the locking combination and another of the read values; and
storing results of the comparisons, wherein a match result for at least one comparison is stored as a zero and a match result for at least one other comparison is stored as a one.

31. A computer program product comprising a computer usable medium having computer readable program code embodied therein for identifying hack attacks against a protected system, the computer program product comprising:
computer readable program code for causing the computer to read a value of a lock word from a memory at least two times, the lock word associated with a lockable feature; and
computer readable program code for causing the computer to identify a hack attack based on the at least two read values.

32. The computer program product of claim 31, wherein the computer readable program code for causing the computer to identify a hack attack comprises:
computer readable program code for comparing each of the read values to another of the read values; and
computer readable program code for identifying a hack attack when the comparing yields a non-match between at least two of the read values.

33. The computer program product of claim 31, wherein:
the lockable feature is locked when the lock word has a value equal to a locking combination; and
the computer readable program code for causing the computer to identify a hack attack comprises:
computer readable program code for comparing each of the read values to the locking combination; and
computer readable program code for identifying a hack attack when the comparing yields a non-match between at least one of the read values and the locking combination.

34. The computer program product of claim 31, wherein:
the lockable feature is locked when the lock word has a value equal to a locking combination; and
the computer readable program code for causing the computer to identify a hack attack comprises:
computer readable program code for comparing each of the read values to another of the read values;
computer readable program code for identifying a hack attack when the comparing yields a non-match between at least two of the read values;
computer readable program code for comparing at least one of the read values to the locking combination when all of the read values match; and
computer readable program code for identifying a hack attack when the comparing yields a non-match between the at least one read value and the locking combination.

35. The computer program product of claim 31, wherein:
the lockable feature is locked when the lock word has a value equal to a locking combination; and
the computer readable program code for causing the computer to identify a hack attack comprises:
computer readable program code for comparing each of the read values to one of the locking combination and another of the read values; and
computer readable program code for storing results of the comparisons, wherein a match result for at least one comparison is stored as a zero and a match result for at least one other comparison is stored as a one.

36. A method for controlling lockable features in a protected system, comprising:
checking a desired state of a lockable feature a plurality of times, wherein allowable use of the lockable feature is restricted in accordance with a predetermined locked level during the checks; and
liberalizing use of the lockable feature to a predetermined unlocked level if all of the checks reflect a desired unlocked state.

37. A system for controlling lockable features in a protected system, comprising:
a nonvolatile memory with write ability;
a checker operable to check a desired state of a lockable feature a plurality of times; and
an unlocker operable to liberalize use of the lockable feature when the plurality of checks identically reflect a desired unlocked state.

38. A method for controlling lockable features in a protected system having a nonvolatile memory with write ability, the method comprising:
checking a desired state of a lockable feature a plurality of times, wherein allowable use of the lockable feature is restricted in accordance with a predetermined locked level during the checks; and
liberalizing use of the lockable feature to a predetermined unlocked level if all of the checks reflect a desired unlocked state.

39. A program storage device readable by machine, tangibly embodying a program of instructions executable by the machine to:
check a desired state of a lockable feature a plurality of times, wherein allowable use of the lockable feature is restricted in accordance with a predetermined locked level during the checks; and
liberalize use of the lockable feature to a predetermined unlocked level if all of the checks reflect a desired unlocked state.

40. A computer program product comprising a computer usable medium having computer readable program code embodied therein for controlling lockable features in a protected system having nonvolatile memory with write ability, the computer program product comprising:
computer readable program code for causing the computer to check a desired state of a lockable feature a plurality of times, wherein allowable use of the lockable feature is restricted in accordance with a predetermined locked level during the checks; and
computer readable program code for causing the computer to liberalize use of the lockable feature to a predetermined unlocked level if all of the checks reflect a desired unlocked state.

* * * * *